United States Patent [19]
Bauer et al.

[11] 3,890,416
[45] June 17, 1975

[54] METHOD FOR PRODUCING A CAVITY OR A ZONE OF VERY LOW DENSITY IN THE INTERIOR OF EXTRUDED PROFILES OF FOAMABLE THERMOPLASTICS

[75] Inventors: Johann Bauer, Burghausen; Hansjochen Barth, Emmerting, both of Germany

[73] Assignee: Wacker-Chemie GmbH, Munich, Germany

[22] Filed: May 4, 1973

[21] Appl. No.: 357,251

[30] Foreign Application Priority Data
May 5, 1972 Germany.......................... 2222194

[52] U.S. Cl.............. 264/45.5; 264/54; 264/176 R; 425/381; 264/46.1
[51] Int. Cl. ........................ C08g 27/00; B29f 3/00
[58] Field of Search ....... 260/45, 47, 54; 264/176 R

[56] References Cited
UNITED STATES PATENTS
2,766,481  10/1956  Henning.......................... 264/47 X 3,608,138   9/1971   Marcovitch..................... 264/176 R
3,751,537   8/1973   Scotto et al...................... 264/45 X
3,773,873   11/1973  Spaak et al. ..................... 264/47 X
3,782,870   1/1974   Schippers....................... 264/47 X
3,806,567   4/1974   Graharn et al................... 264/45 X

*Primary Examiner*—H. S. Cockeram
*Attorney, Agent, or Firm*—Hammond & Littell

[57] ABSTRACT

An apparatus for the production of a cavity or a zone of very low density in the interior of extruded profiles of foamable thermoplastics consisting of an extruder having an extrusion screw and a form-giving extruder head having a flow channel therethrough characterized in that said extrusion screw is provided with a tip having three sections, the part of said tip adjacent to the end of said extrusion screw being conical, the middle part of said tip being cylindrical and the front part of said tip being again conical, wherein said cylindrical part of said tip extends further into said flow channel of said extruder head than the dimension of the outside diameter of said cylindrical part of said tip, as well as the process of extrusion.

2 Claims, 2 Drawing Figures

3,890,416

METHOD FOR PRODUCING A CAVITY OR A ZONE OF VERY LOW DENSITY IN THE INTERIOR OF EXTRUDED PROFILES OF FOAMABLE THERMOPLASTICS

THE PRIOR ART

For the production of foamed profiles from thermoplastics by the extrusion process, usually extruder dies are used which are smaller than the desired final cross-section of the extruded profile. By expansion of the issuing extrusion, the profile attains the desired cross-section. By a subsequent cooling or calibrating, the exact form desired of the profile can be obtained.

Further a process is known where a hollow profile is extruded which has exactly the desired cross-section of the profile or a partly divergent cross-section. The expansion of the profile occurs in a heated calibrating section inwardly and optionally also outwardly into the existing cavities. The profile may be filled entirely or only partly by this expansion.

It is a disadvantage of these processes that in the extrusion of full profiles the possible density attainable has a lower limit, as thermoplastics are not infinitely expandable and the pore size cannot be increased infinitely. Nor can the number of pores be increased infinitely.

If, instead, a hollow profile is being extruded, this requires a mandrel mounted on the exit of the extrusion head. The mandrel mounts bring about a division of the extrusion into several partial streams which, after passing the mandrel mounts, merge again only partially. This creates weak points in the extrudate, especially in the case of thin-walled profiles.

OBJECTS OF THE INVENTION

An object of the invention is the development of an improved apparatus for the production of a cavity or a zone of very low density in the interior of extruded profiles of foamable thermoplastics.

Another object of the invention is the development of an apparatus for the production of a cavity or a zone of very low density in the interior of extruded profiles of foamable thermoplastics consisting of an extruder having an extrusion screw and a form-giving extruder head having a flow channel therethrough characterized in that said extrusion screw is provided with a tip having three sections, the part of said tip adjacent to the end of said extrusion screw being conical, the middle part of said tip being cylindrical and the front part of said tip being again conical, wherein said cylindrical part of said tip extends further into said flow channel of said extruder head than the dimension of the outside diameter of said cylindrical part of said tip.

A further object of the invention is the development of a process for the production of a cavity or a zone of very low density in the interior of an extruded profile of a foamable thermoplastic which consists of extruding a foamable thermoplastic through a narrow annular orifice containing no restrictions within said narrow annular orifice, the inner surface of said narrow annular orifice comprising a rotating cylinder having a conical tip, foaming said foamable thermoplastic and recovering a foamed thermoplastic having a cavity or a zone of very low density in the interior of its profile.

These and other objects of the invention will become more apparent as the description thereof proceeds.

THE DRAWINGS

DESCRIPTION OF THE INVENTION

The above objects have been achieved and the drawbacks of the prior art have been overcome by the present development of an apparatus and method for the production of a cavity or of a zone of very low density in the interior of extruded profiles of a foamable thermoplastic. More particularly, the invention comprises an apparatus for the production of a cavity or a zone of very low density in the interior of extruded profiles of foamable thermoplastics consisting of an extruder having an extrusion screw and a form-giving extruder head having a flow channel therethrough characterized in that said extrusion screw is provided with a tip having three sections, the part of said tip adjacent to the end of said extrusion screw being conical, the middle part of said tip being cylindrical and the front part of said tip being again conical, wherein said cylindrical part of said tip extends further into said flow channel of said extruder head than the dimension of the outside diameter of said cylindrical part of said tip; as well as a process for the production of a cavity or a zone of very low density in the interior of an extruded profile of a foamable thermoplastic which consists of extruding a foamable thermoplastic through a narrow annular orifice containing no restrictions within said narrow annular orifice, the inner surface of said narrow annular orifice comprising a rotating cylinder having a conical tip, foaming said foamable thermoplastic and recovering a foamed thermoplastic having a cavity or a zone of very low density in the interior of its profile.

Figure 1:
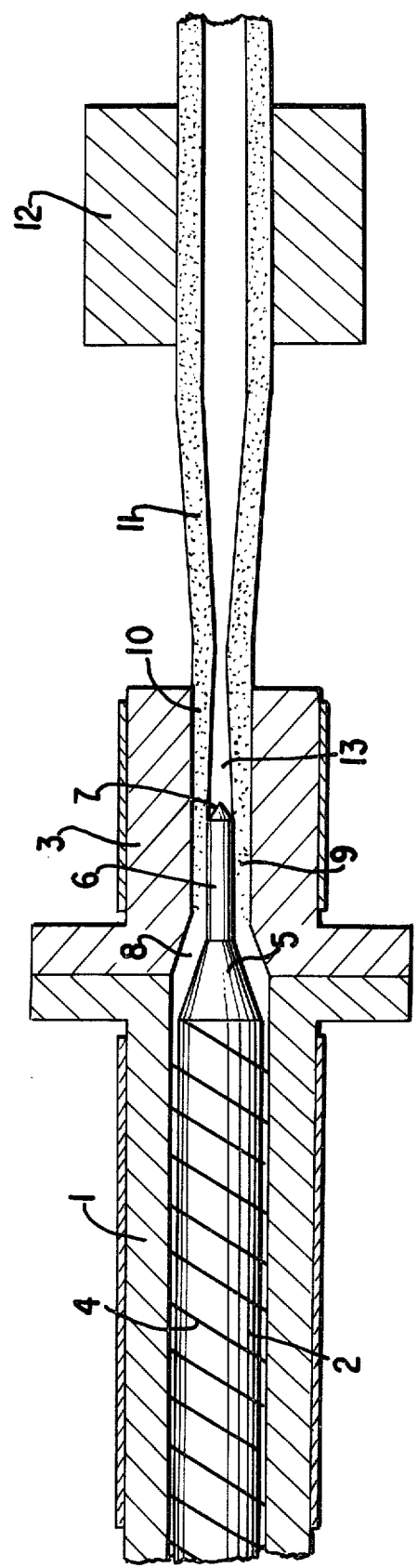
FIG. 1 is a cross-section view of the apparatus of the invention.

The apparatus as shown in FIG. 1 consists of an extruder 1 with an extrusion screw 2 and a form-giving extruder head 3 and is characterized in that the extrusion screw includes a tip 5, 6, 7 consisting of three sections, the part 5 adjacent the screw thread 4 being conical, the middle part 6 being cylindrical, and the front part 7 being again conical, with the cylindrical part 6 of this tip protruding deeper into the flow channel 8 of the extruder head 3 than the dimension of its outside diameter.

The use of screws with tips of special form in extruders for thermoplastic materials is basically known. It has been found, however, that by the specific design of the tip according to the invention special advantages can be attained in the production of foamed profiles from foamable thermoplastics. The tip causes cavity formation in the unexpanded thermoplastic extrusion. As foaming occurs, the cavity can be preserved in part, or it can be foamed closed. In the latter case the density of the material in the interior is especially low, in the former case cavities are formed in the interior. That is, it is possible with the new apparatus to produce shaped bodies of very low total density which present no weak points as in the previously known methods for the production of foamed hollow profiles. Further it is favorable that the gas pressure resulting in the cavity of the extrusion on foaming additionally inflates the profile.

For the practice these advantages mean that, for instance, for a shaped body of a certain size less material is needed, or that, using the same amount of material, one can get to shaped bodies of greater cross-section, which therefore have greater strength, since material has been previously removed from the central core of the shaped body.

It has appeared also that in the foamed profiles the disturbances produced by the rotating screw tip do not have the disadvantageous effect on the strength properties of the extrusion as in unfoamed thermoplastics. Besides, surprisingly, the disturbances are less prominent with this method.

The apparatus consists of an extruder with known equipment. On the screw 2 of the extruder 1 the tip 5, 6, 7 according to the invention is mounted, preferably a screw mounting. It thus becomes possible to apply an optimally adapted tip, depending on the extrusion head used and the profile desired. The thickness of the cylindrical part 6 and the lenght of cylindrical part 6 of the screw tip can be varied within wide ranges. Preferably, the cylindrical part of the screw tip 6 has a minimum diameter of 3 mm, and the difference between inside and outside diameter of the annular gap 9 between the outer wall of the flow channel and the cylindrical part 6 of the screw tip is not less than 1 mm. The cone angle of the conical parts of the screw tip is usually 60° to 100°.

For reasons of strength, the tip is usually made of high-strength material, e.g. tool steel. It may also be surface treated, to improve its slip properties relative to foamable thermoplastics. It is preferably teflonized.

The screw tip protrudes into the flow channel of the extruder head. Preferably, the cylindrical part 6 of the screw tip does not extend farther into the extruder head 3 than to the outlet cross-section of the flow channel 8.

Figure 2:
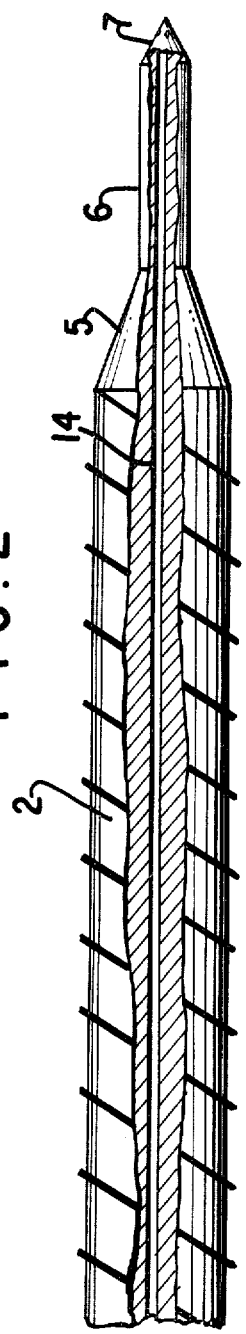
FIG. 2 is a cross-section view of another embodiment of the extrusion screw of the invention.

Another preferred form of the apparatus as shown in FIG. 2 is characterized in that the screw 2 and the screw tip 5, 6, 7 have a central bore 14. Through this bore gases, possibly heated gases, may be blown or vaporizable liquids introduced. The gases and the vaporized liquids additionally serve to inflate the profile. The screw and the tip may also be double-walled, so that heating by heated auxiliary media is possible.

The extrusion head 3 determines the form of the profile. Preferably extruder heads are used which lead to profiles with a small ratio of the outer surface per defined length to the cross-section area. The exact forming of the profile can occur through a cooling section or forming device 12.

Examples of thermoplastics which can be extruded and foamed with the apparatus according to the invention are PVC and its copolymers, polystyrene, acrylonitrile-butadiene-styrene terpolymers and polyethylene. The mixtures used contain the usual recipe components, such as lubricants, stabilizers, and foaming agents. By the selection of the recipe, the properties of the profile can be influenced to a very large extent.

FIG. 1 shows the extruder 1 with form-giving extruder head 3, the screw 2 and its screw thread 4 with tip 5, 6, 7 in operation. The foamed extrusion 10, the foaming zone 11 and the expanded, finished profile extrusion with the calibrating device 12 are also shown. The screw tip 5, 6, 7 consisting of a conical part 5, a cylindrical part 6 and again a conical part 7 protrudes into the flow channel 8 of the extruder head 3 and forms the annular gap 9. The cavity 13 in the thermoplastic material is produced by this tip.

FIG. 2 shows a special form of the screw and screw tip, in which a central bore 14 is introduced.

The following specific examples of the invention are not limitative in any respect.

EXAMPLE 1 (COMPARISON)

A foamable hard polyvinyl chloride mixture with the components polyvinyl chloride ("Vinnol", Wacker-Chemie) having a K value of 60, stabilizers, lubricants and azodicarbonamide (0.3 p. by wt.) as foaming agent, was extruded through an extruder with a screw diameter of $D = 45$ mm, a screw length of 20 D and a volume compression of 1.3 through a round die with a diameter of $d = 15$ mm to form a cylindrical full extrusion. The diameter of the extrudate after forming was 29 mm, the density of the foamed extrusion 0.62 g/cm$^3$.

EXAMPLE 2 (COMPARISON)

The same mixture was processed with the same extruder as in Example 1, but with an extrusion head normally used for the production of tubes with a die diameter of again $d_1 = 15$ mm and a mandrel mounted on the die having a diameter of $d_2 = 5$ mm to form a hollow extrusion. The outside diameter of the resulting tube was 32 mm, the inside diameter 6 mm. The density of the tubular extrusion was 0.71 g/cm$^3$, the density of the entire profile, including the cavity, was 0.69 g/cm$_3$. The mandrel mounts produce clearly visible marking strips along the profile and bubble or blister type thickenings in the inner surface of the cavity.

EXAMPLE 3

This time the mandrel including the mandrel mount was removed from the head and a screw tip consisting of a conical part (as per FIG. 1, No. 5), a cylindrical part of a diameter of 5 mm (as per FIG. 1, No. 6) and a conical tip (as per FIG. 1, No. 7) was applied to the end of the screw. The cylindrical part of the tip ended inside the flow channel 10 mm from the outlet cross-section. The same PVC hard mixture, as in Example 1, was extruded with this apparatus. The produced profile had a diameter of 36 mm, the density of the tubular extrusion was 0.58 g/cm$^3$, the density of the total extrusion was 0.51 g/cm$^3$.

The preceding specific embodiment is illustrative of the practice of the invention. It is to be understood, however, that other expedients known to those skilled in the art or disclosed herewin may be employed without departing from the spirit of the invention or the scope of the appended claims.

We claim:

1. A process for the production of a cavity or a zone of very low density in the interior of an extruded profile of a foamable thermoplastic which consists of extruding a foamable thermoplastic through a narrow annular orifice flow channel containing no restriction within said narrow annular orifice, the outer surface of said flow channel being defined by the length of an extruder head, the inner surface of said narrow annular orifice flow channel comprising a rotating cylinder having a conical tip extending in the direction of extrusion flow, wherein said rotating cylinder extends further into said flow channel of said extruder head than the dimension of the outside diameter of said rotating cylinder, foaming said foamable thermoplastic and recovering a foamed thermoplastic having a cavity or a zone of very low density in the interior of its profile.

2. The process of claim 1 wherein said rotating cylinder having a conical tip does not extend beyond the outlet cross-section of said extruder head.

* * * * *